F. DEVÈS.
TRANSMISSION GEARING.
APPLICATION FILED JULY 17, 1911.
1,064,889.
Patented June 17, 1913.
3 SHEETS—SHEET 3.
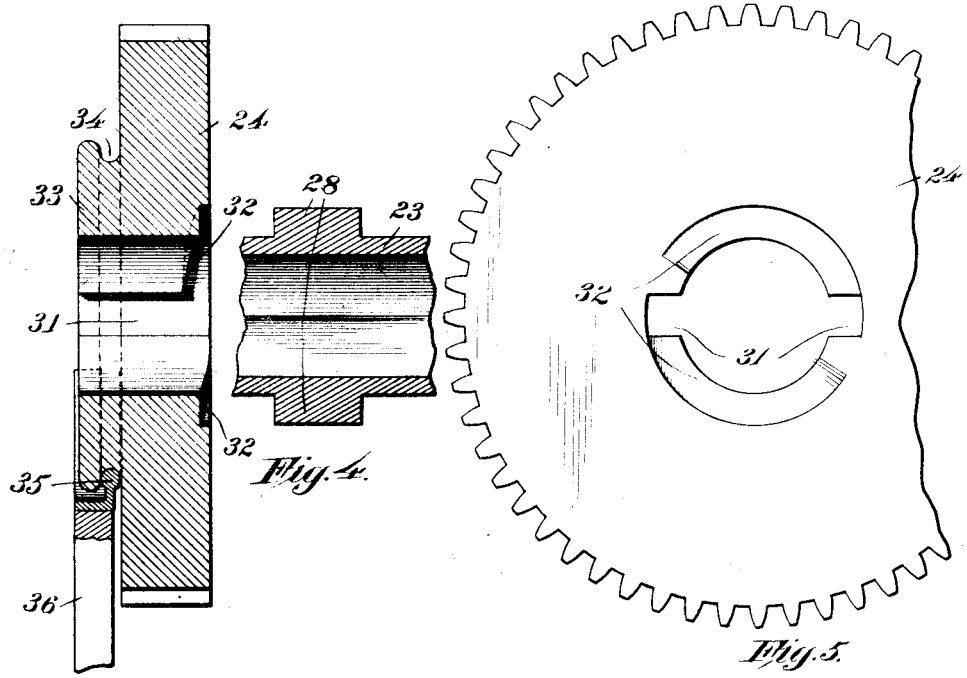
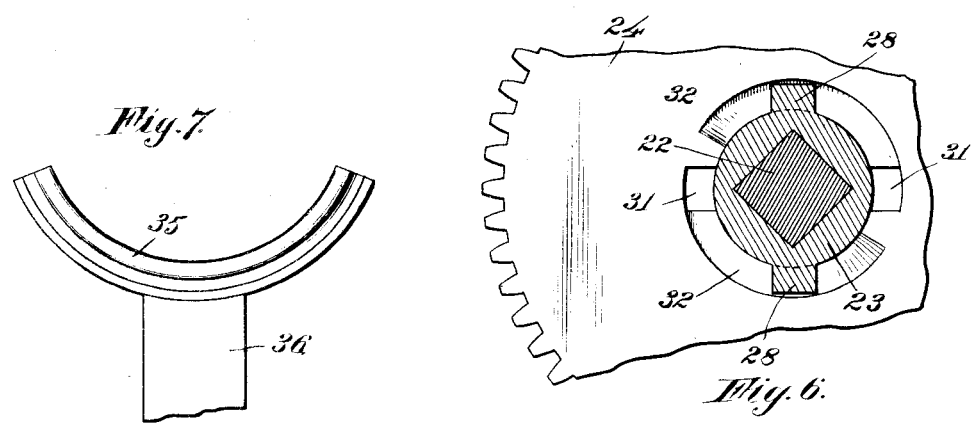
Witnesses
H. S. Austin
J. M. Wisener
Inventor
François Devès
By Joshua R. H. Potts
Attorney

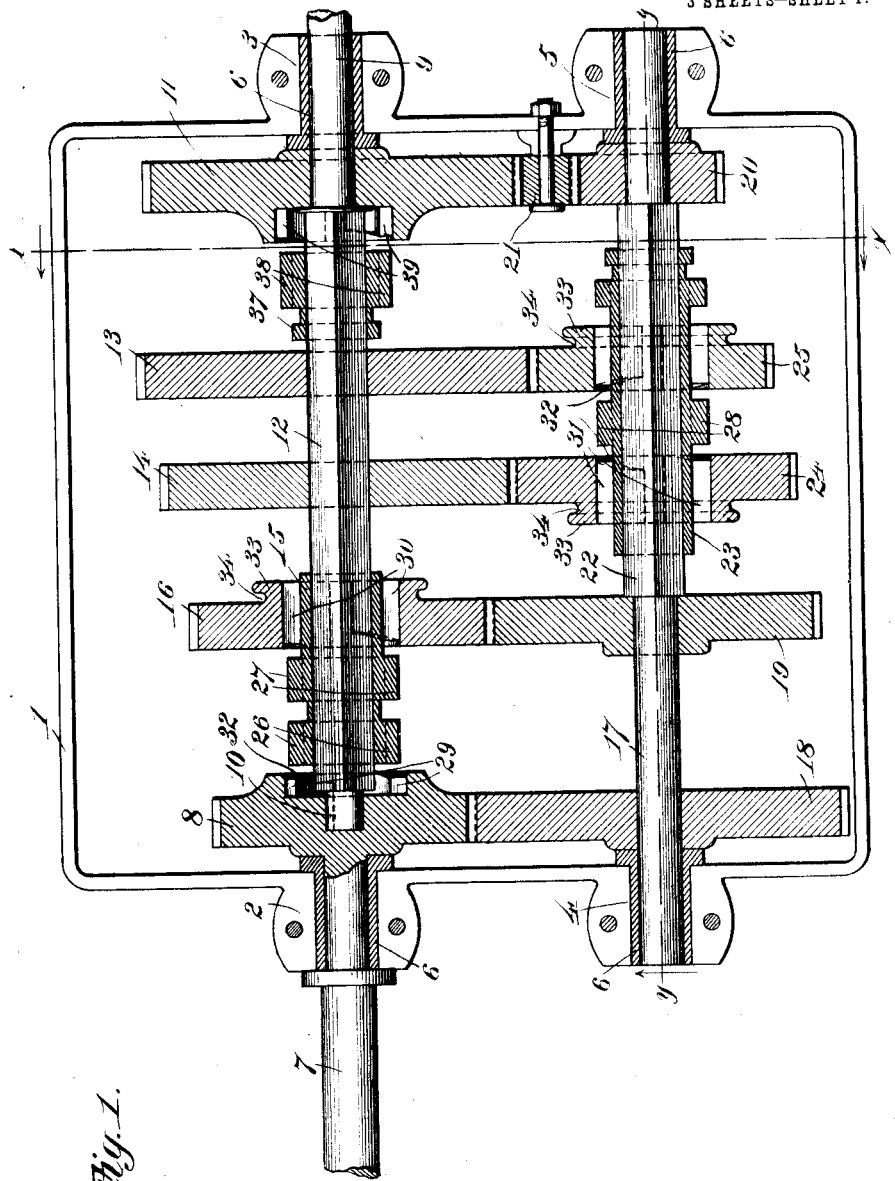

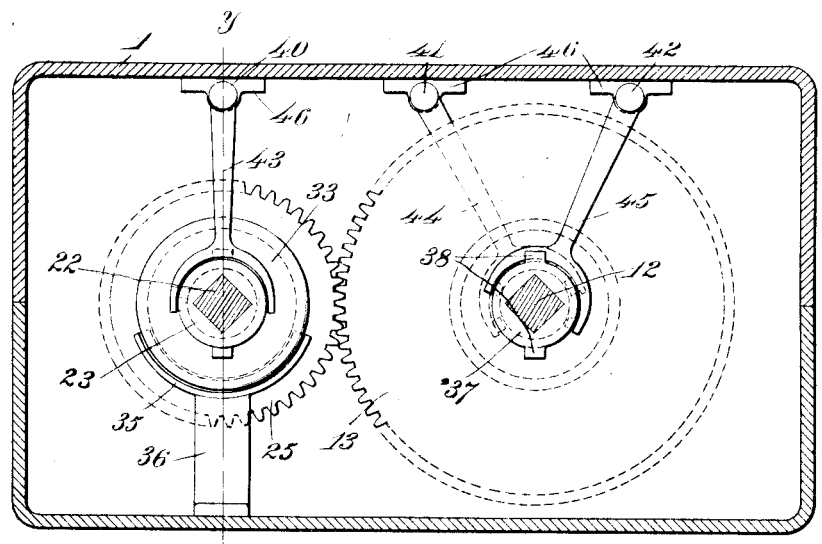
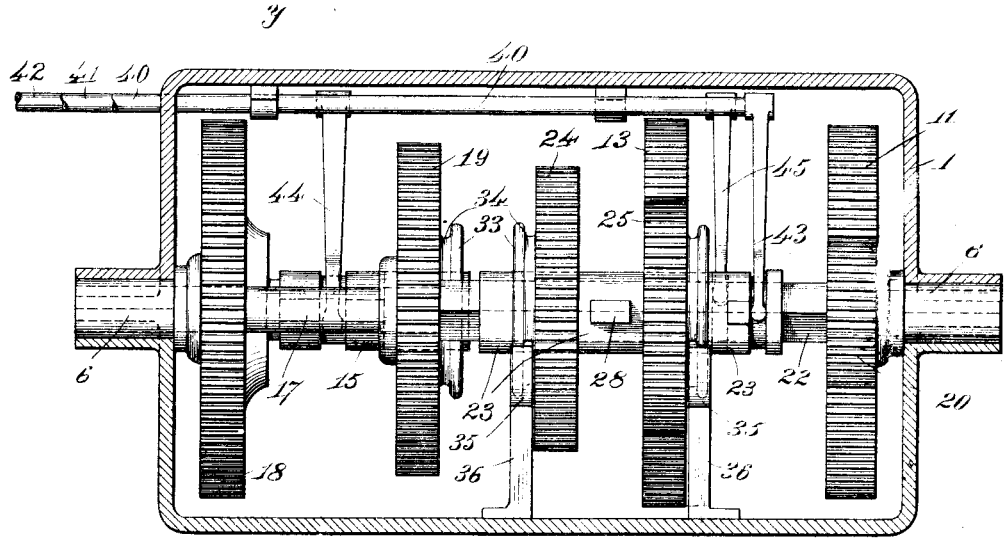

UNITED STATES PATENT OFFICE.

FRANÇOIS DEVÈS, OF NEW YORK, N. Y.

TRANSMISSION-GEARING.

1,064,889.

Specification of Letters Patent. Patented June 17, 1913.

Application filed July 17, 1911. Serial No. 638,958.

*To all whom it may concern:*

Be it known that I, FRANÇOIS DEVÈS, a citizen of the United States, residing at New York, county of New York, and State of New York, have invented certain new and useful Improvements in Transmission-Gearing, of which the following is a specification.

My invention relates to transmission gearing and particularly to transmission gearing adapted for use on automobiles, although it is to be understood that the transmission gearing hereinafter described and claimed may be used in conjunction with various machines for different purposes.

The object of my invention is to provide an improved transmission gearing whereby the shock or jar incident to changing from one speed to another is substantially overcome.

A further object of my invention is to provide a transmission gearing of such construction that stripping of the gears and breaking of the teeth in changing the speeds will be prevented.

Other objects will appear hereinafter.

With these objects in view my invention consists generally in a power shaft and a transmission shaft in alinement therewith, a jack shaft parallel with the first mentioned shafts, a gear on the end of the drive shaft and a plurality of gears of different diameters fixed to said transmission shaft, a plurality of gears on said jack shaft meshing with the gears on the first said shafts, sleeves rotatably fixed but slidably mounted on said transmission shaft and said jack shaft, certain of the aforementioned gears being loosely mounted to rotate on said sleeves, the gears with which the last said gears are in mesh being fixed to their respective shafts, co-acting clutch members on said sleeves and the gears mounted thereon, means to prevent longitudinal movement of the gears with respect to said sleeves and means for shifting said sleeves to throw said clutch members into or out of coöperation.

My invention further consists in various details of construction and arrangements of parts all as will be fully described hereinafter and particularly pointed out in the claim.

My invention will be more readily understood by reference to the accompanying drawings forming a part of this specification and in which—

Figure 1 is a horizontal section of a transmission gearing embodying my invention in its preferred form, Fig. 2 is a vertical transverse section on the line $x$—$x$ of Fig. 1, Fig. 3 is a vertical longitudinal section on substantially the line $y$—$y$ of Figs. 1 and 2, Fig. 4 is a diametrical section through one of the gears, a portion of the sliding sleeve and means for maintaining the gear against longitudinal movement on the sleeve, Fig. 5 is a face view of the gear, Fig. 6 is a similar view illustrating in conjunction with the gear, a section of the shaft and the sliding sleeve upon which the gear is mounted, and Fig. 7 is a detailed view of one of the devices for holding the gear against longitudinal movement in the sleeve.

Referring now to the drawings 1 indicates a suitable casing adapted to contain the transmission gearing and provided with bearings 2, 3, 4 and 5 each of which is equipped with a suitable bushing 6.

7 indicates the drive shaft or engine shaft. This extends through the bushing of the bearing 2 and upon its inner end is a pinion 8.

9 indicates the transmission shaft which extends through the bearing 3, in alinement with the shaft 7 and having its inner end 10 journaled in the pinion 8 as shown clearly in Fig. 1.

Rotatably mounted on the shaft 9 adjacent the bearing 3 is a large gear 11, the purpose of which will appear hereinafter. From the gear 11 to the journal 10, the shaft is preferably square in cross section as indicated. Fixed to the squared portion 12 of the shaft 9 are a pair of gears 13 and 14 of different dimensions. Slidably mounted on the squared portion 12 adjacent the gear 8 is a sleeve 15 and rotatably mounted on one end of said sleeve is a gear 16. The gears 8, 16, 14 and 13 are each of different diameters.

Mounted in the bearings 4 and 5, and parallel to the shafts 7 and 9, is a jack shaft 17. Fixed to the shaft 17 are gears 18, 19 and 20. The gears 18 and 19 mesh with the gears 8 and 16 respectively, and the gear 20 meshes with an idler 21 which in turn meshes with the gear 11. The portion of the shaft between the gears 19 and 20 is squared as at 22 and upon the squared portion is slidably mounted a sleeve 23. Rotatably mounted upon the sleeve 23 are gears 24 and 25, meshing respectively with the gears 14 and 13 on the shaft 9. By this construction, whenever the shaft 7 is turning, the gears 8, 18, 19, 16 and 20 and the gear 11, together with the shaft 17 are in motion, the gear 11 in reversed direction, owing to the idler 21. However, the shaft 12 and gears 24, 25, 14 and 13 remain motionless until one of the gears 24, 25, 8, 16 or 11 is coupled to its respective shaft.

To couple the several gears to their shafts the sleeves 15 and 23 and the gears mentioned are provided with co-acting means for this purpose, and a separate device is provided for the reverse gear 11. To this end the sleeve 15 is provided with radially extending longitudinally disposed blocks or projections 26 and 27 and the sleeve 23 with similar blocks or projections 28. These projections are adapted to enter recesses 29, 30 and 31 in the gears 8, 16, 24 and 25 respectively, according to the direction in which the sleeves are shifted. By shifting the sleeve 23 to engage the projections 28 with the gear 25, the lowest forward speed is obtained and by shifting the sleeve in the opposite direction to engage the gear 24 the next speed is obtained. A third speed is obtained by shifting the sleeve 15 to engage the projections 27 with the gear 16, and the highest speed is obtained by shifting the sleeve 15 in the opposite direction engaging the projections 26 with the gear 8, whereby the engine shaft is coupled directly to the transmission shaft. It will be noted that as soon as the sleeve 23 is shifted to obtain the lowest speed all of the gears are set in motion so that in throwing in the higher speeds there is practically no shock.

To facilitate the entrance of the projections on the sleeves into their respective recesses in the gears, the faces of the hubs or naves of the gears are formed with helical inclines 32 which guide said projections into said recesses and insure a sufficient initial entrance of the projections to prevent injury or stripping of the same.

It is obvious that suitable means must be provided to prevent longitudinal movement of the gears 16, 24 and 25. To this end said gears are provided with enlarged hubs 33 each having a peripheral groove 34 formed therein, and these grooves are engaged by arcuate members 35 mounted on suitable supports 36.

37 indicates a sleeve slidably mounted on the squared portion 12 of the shaft 9 adjacent the gear 11 and provided with projections 38 adapted to enter recesses 39 in the hub of the reversed gear 11. To reverse, the sleeves 15 and 23 are shifted to withdraw their respective clutch members from the direct drive gears which leaves the gear 11 turning in the reversed direction to that of the shaft 7 and at the lowest speed. The sleeve 37 is then shifted to engage the projections 38 in the recesses 39 thereby coupling the gear 11 to the shaft 9 and causing the latter to rotate in reversed direction.

40, 41 and 42 indicate rods extending into the casing 1 and provided with yokes 43, 44 and 45 respectively engaging the sleeves 15, 37 and 23 and by means of which said sleeves are shifted. The rods are preferably provided with suitable guides 46 and are connected to suitable levers arranged adjacent the driver's seat.

Having described my invention what I claim as new and desire to secure by Letters Patent is:—

In transmission gearing, a power shaft and a transmission shaft in alinement therewith, in combination with a jack shaft parallel with the first said shafts, a single pair of intermeshing gears fixed to said power shaft and said jack shaft respectively, sleeves rotatably fixed but slidably mounted on said transmission shaft and said jack shaft, gears rotatably mounted on said sleeves, gears fixed to the transmission shaft and jack shaft respectively and meshing with the gears on the sleeves of the opposite shafts, means for shifting said sleeves, the gears on said sleeves each being provided with a recess and an enlarged hub formed with a peripheral groove, a stationary arcuate member engaging each of said grooves to prevent longitudinal movement of the gears and there being a projection on each of said sleeves adapted to engage in said recesses when said sleeve is shifted, substantially as described.

In testimony whereof I have signed my name to this specification in the presence of two subscribing witnesses.

FRANÇOIS DEVÈS.

Witnesses:
MARGUERITE DEVÈS,
EDWARD W. LACKEY.